UNITED STATES PATENT OFFICE.

KARL MORITZ HELLWIG, OF BERLIN, GERMANY.

ANTISEPTIC TOOTH-PICK.

SPECIFICATION forming part of Letters Patent No. 410,794, dated September 10, 1889.

Application filed December 6, 1888. Serial No. 292,834. (No specimens.)

*To all whom it may concern:*

Be it known that I, KARL MORITZ HELLWIG, a subject of the King of Prussia and Emperor of Germany, and a resident of Berlin, in the Kingdom of Prussia, German Empire, have invented a new and useful Antiseptic Tooth-Pick; and I do hereby declare that the following is a full, clear, and exact description of the same.

The object of this invention is to produce a tooth-pick which will not only serve the purposes of the ordinary tooth-pick now in use, but also serve as a disinfectant and impart a fragrance to the teeth and the mouth.

In carrying out the invention, the tooth-picks, which are made of any suitable wood, are placed in a spirituous aromatic solution, in which they are allowed to remain for from eight to fourteen days, until thoroughly saturated. After this an antiseptic fluid, such as salicylic acid or other suitable preparation, preferably orthoxyphenol sulphur acid, known in the trade as "aseptol," ($C_6H_4OHSO_2OH$,) is forced into the wood by exposing it to pressure. This fluid permeates the wood and fills the pores thereof and becomes fixed therein.

The use of these tooth-picks after eating will not only produce a fragrance in the breath, but the antiseptic preparation will, while cleansing the teeth, be brought in contact with the gums and cavities of the teeth and through the saliva with the cavities of the mouth and will disinfect any particles of food which may be lodged between the teeth. Consequently the most important condition for the preservation of the teeth is obtained—namely, the prevention of the formation of fungus, so that the teeth will be preserved from decay, or, if already carious, will be cured by a continuous use of these tooth-picks. Consequently in these tooth-picks are combined three important qualities—namely, the mechanical cleaning of the teeth, the aromatizing of the breath, and the disinfecting of the cavities of the teeth and mouth. The two latter qualities render it advisable to use the tooth-pick not only immediately after meals, but frequently in the course of the day, as they possess good and agreeable medicinal qualities for the preservation or restoration of a healthy condition of the teeth.

What I claim as new, and desire to secure by Letters Patent, is—

1. As an improved article of manufacture, a tooth-pick saturated with a spirituous aromatic solution and impregnated with an antiseptic liquid, substantially as and for the purpose herein described.

2. As an improved article of manufacture, a tooth-pick saturated with aseptol, substantially as and for the purposes described.

In witness whereof I have hereunto set my hand in presence of two witnesses.

KARL MORITZ HELLWIG.

Witnesses:
ALEX SCHOLZE,
B. ROI.